US011721492B2

(12) United States Patent
Oyama et al.

(10) Patent No.: US 11,721,492 B2
(45) Date of Patent: Aug. 8, 2023

(54) CAPACITOR BLOCK HAVING A SPACER

(71) Applicant: MITSUBISHI PAPER MILLS LIMITED, Tokyo (JP)

(72) Inventors: Keisuke Oyama, Tokyo (JP); Tomohiro Sato, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 146 days.

(21) Appl. No.: 17/423,538

(22) PCT Filed: Mar. 19, 2020

(86) PCT No.: PCT/JP2020/012170
§ 371 (c)(1),
(2) Date: Jul. 16, 2021

(87) PCT Pub. No.: WO2020/196215
PCT Pub. Date: Oct. 1, 2020

(65) Prior Publication Data
US 2022/0115186 A1 Apr. 14, 2022

(30) Foreign Application Priority Data

Mar. 26, 2019 (JP) ................................. 2019-059101
Feb. 21, 2020 (JP) ................................. 2020-028178

(51) Int. Cl.
*H01G 9/02* (2006.01)
*H01G 9/15* (2006.01)

(52) U.S. Cl.
CPC ................ *H01G 9/02* (2013.01); *H01G 9/15* (2013.01)

(58) Field of Classification Search
CPC .................................... H01G 9/02; H01G 9/15
See application file for complete search history.

(56) References Cited

U.S. PATENT DOCUMENTS

| | | | |
|---|---|---|---|
| 2007/0287062 A1 | 12/2007 | Tsukuda et al. | |
| 2015/0064573 A1 | 3/2015 | Kaji et al. | |
| 2018/0287119 A1 | 10/2018 | Igawa et al. | |
| 2019/0198837 A1* | 6/2019 | Yushin ................ | H01M 50/489 |
| 2020/0091486 A1 | 3/2020 | Shigematsu et al. | |
| 2021/0288382 A1* | 9/2021 | Shigematsu ...... | H01M 10/0525 |

FOREIGN PATENT DOCUMENTS

| | | | | |
|---|---|---|---|---|
| CN | 104425791 A | 3/2015 | | |
| EP | 3951814 A1 * | 2/2022 | ............... | H01G 9/02 |
| JP | H05267103 A | 10/1993 | | |
| JP | 2001332451 A | 11/2001 | | |
| JP | 2004235293 A | 8/2004 | | |
| JP | 2007150122 A | 6/2007 | | |
| JP | 2010232202 A | 10/2010 | | |
| JP | 2011228320 A | 11/2011 | | |
| JP | 2012195162 A | 10/2012 | | |
| JP | 2016001663 A | 1/2016 | | |
| JP | 2016204798 A | 12/2016 | | |
| JP | 2017069229 A | 4/2017 | | |
| JP | 2017174928 A | 9/2017 | | |
| JP | 2017199728 A | 11/2017 | | |
| JP | 2018125272 A | 8/2018 | | |
| WO | 2005101432 A1 | 10/2005 | | |
| WO | 2018123689 A1 | 7/2018 | | |

OTHER PUBLICATIONS

International Search Report (PCT/ISA/210) with translation and Written Opinion (PCT/ISA/237) dated Jul. 7, 2020, by the Japan Patent Office as the International Searching Authority for International Application No. PCT/JP2020/012170. (8 pages).
Office Action dated Sep. 29, 2020, by the Japanese Patent Office for Application No. 2020-028178. (2 pages).

* cited by examiner

*Primary Examiner* — Eric W Thomas
(74) *Attorney, Agent, or Firm* — Buchanan Ingersoll & Rooney PC

(57) ABSTRACT

An object of the present invention is to provide a solid electrolytic capacitor separator configured such that thickness non-uniformity is reduced, internal short-circuit is less likely to occur, an impedance is not too high, and a high heat resistance is exhibited. In a solid electrolytic capacitor separator including non-woven fabric, the non-woven fabric contains fibrillated heat-resistant fibers and synthetic short fibers as essential components, the fiber length of the fibrillated heat-resistant fiber is 0.30 to 0.75 mm, and the percentage of fibrillated heat-resistant fibers with a fiber width of 12 to 40 μm is equal to or higher than 55% and lower than 75%.

2 Claims, No Drawings

CAPACITOR BLOCK HAVING A SPACER

TECHNICAL FIELD

The present invention relates to a solid electrolytic capacitor separator. Hereinafter, the "solid electrolytic capacitor separator" will be sometimes abbreviated as a "separator." Moreover, a "solid electrolytic capacitor" will be sometimes abbreviated as a "capacitor."

BACKGROUND ART

In a solid electrolytic capacitor using conductive polymer such as polypyrrole or polythiophene as a solid electrolyte, foil-like anode and cathode electrodes are wound up through a separator to form a wound element, and a conductive polymer film covering up the separator is formed in such a manner that the separator in the wound element is dipped and polymerized in a conductive polymer polymerization solution or is dipped in a conductive polymer dispersing solution.

Typically, a paper separator mainly including a beaten object of cellulose fibers such as natural cellulose fibers including espartos, hemp pulps, etc., solvent-spun cellulose fibers, and regenerated cellulose fibers has been used as a capacitor separator (Patent Literatures 1 and 2). The cellulose fibers in such a paper separator react with an oxidant used upon polymerization of conductive polymer to interfere with polymerization of the conductive polymer. For this reason, a carbonization process is performed in advance such that interference with polymerization is avoided. Thus, in some cases, electrode burrs easily penetrate the separator due to heat shrinkage or fragility of the paper separator caused by the carbonization process, and there are problems such as a high short-circuit defect rate.

For these reasons, study has been conducted on a separator using non-woven fabric mainly including synthetic fibers (Patent Literatures 3 to 5). In recent years, a temperature required for reflow heat resistance has been increased for a capacitor. The separators of Patent Literatures 3 and 4 exhibit great heat shrinkage under atmosphere at 260° C. in some cases, and a separator with a higher heat resistance has been demanded. Moreover, the separator of Patent Literature 5 is characterized in that the rate of change in dimensions in any of an MD (a machine direction) and a CD (a direction perpendicular to the MD) when a thermal process is performed for 50 hours at 250° C. is −3% to +1%. However, the dispersibility of fibrillated heat-resistant fibers used as a raw material is poor. For this reason, pilling easily occurs, and when the separator is used as it is, thickness non-uniformity is exhibited and an internal short-circuit defect rate and an impedance are high in some cases.

For application to separator non-woven fabric or capacitor non-woven fabric, Patent Literature 6 describes, as the method for providing organic fibers having fibrils beaten by a beating method with less metal foreign material inclusion, organic fibers having fibrils, the organic fibers being characterized in that the organic fibers are obtained by application of impact force upon bubble collapse by cavitation generated using liquid spout from a nozzle or an orifice pipe into an organic fiber suspension. However, Patent Literature 6 evaluates only the tensile strength of handmade paper using the organic fibers having the fibrils, and fails to describe that thickness non-uniformity is caused and an internal short-circuit defect rate increases depending on the dispersibility of the fibers having the fibrils.

CITATION LIST

Patent Literature

PATENT LITERATURE 1: JP-A-5-267103
PATENT LITERATURE 2: JP-A-2017-69229
PATENT LITERATURE 3: JP-A-2001-332451
PATENT LITERATURE 4: JP-A-2004-235293
PATENT LITERATURE 5: WO 2005/101432 A
PATENT LITERATURE 6: JP-A-2016-204798

SUMMARY OF THE INVENTION

Problems to be Solved by the Invention

The present invention has been made in view of the above-described situation, and is intended to provide a solid electrolytic capacitor separator configured such that thickness non-uniformity is reduced, internal short-circuit is less likely to occur, an impedance is not too high, and a high heat resistance is exhibited.

Solution to the Problems

The above-described problems are solved by the following technique.

(1) A solid electrolytic capacitor separator including non-woven fabric, in which the non-woven fabric contains fibrillated heat-resistant fibers and synthetic short fibers as essential components, the fiber length of the fibrillated heat-resistant fiber is 0.30 to 0.75 mm, and the percentage of fibrillated heat-resistant fibers with a fiber width of 12 to 40 μm is equal to or higher than 55% and lower than 75%.

(2) The solid electrolytic capacitor separator according to (1), in which the average curl rate (CURL) of the fibrillated heat-resistant fiber is 5 to 45%.

Effects of the Invention

According to the present invention, advantageous effects that the high heat resistance is exhibited, the impedance is not too high, uniform formation is exhibited, the thickness non-uniformity is reduced, the internal short-circuit is less likely to occur can be achieved.

DESCRIPTION OF THE EMBODIMENTS

<Solid Electrolytic Capacitor>

In the present invention, a solid electrolytic capacitor indicates a solid electrolytic capacitor using, as an electrolyte, functional polymer (conductive polymer) having conductivity. Examples of the functional polymer having the conductivity include polypyrrole, polythiophene, polyaniline, polyacetylene, polyacene, and derivatives thereof. In the present invention, the solid electrolytic capacitor may be a hybrid electrolytic capacitor using both of such functional polymer and an electrolytic solution. Examples of the electrolytic solution include, but not limited to, an aqueous solution in which ionic dissociative salt is dissolved, an organic solvent in which ionic dissociative salt is dissolved, and ionic liquid (solid molten salt). Examples of the organic solvent include propylene carbonate (PC), ethylene carbonate (EC), dimethyl carbonate (DMC), diethyl carbonate (DEC), acetonitrile (AN), γ-butyrolactone (BL), dimethylformamide (DMF), tetrahydrofuran (THF), dimethoxyethane (DME), dimethoxymethane (DMM), sulfolane (SL), dimethylsulfoxide (DMSO), ethylene glycol, and propylene glycol.

<Solid Electrolytic Capacitor Separator>

In the present invention, those obtained in such a manner that heat-resistant fibers made of wholly aromatic polyamide, wholly aromatic polyester, polyimide, polyamide imide, polyetheretherketone, polyphenylene sulfide, polybenzimidazole, poly(p-phenylene benzobisthiazole), poly(p-phenylene benzobisoxazole), polytetrafluoroethylene, etc. are fibrillated are used as a fibrillated heat-resistant fiber as an essential component forming non-woven fabric. Among these fibers, wholly aromatic polyamide is preferred because wholly aromatic polyamide exhibits excellent affinity for the electrolytic solution.

In the present invention, the fiber length of the fibrillated heat-resistant fiber is measured using Kajaani FiberLab V3.5 (manufactured by Metso Automation) as a device. The fiber length of the fibrillated heat-resistant fiber is Length (1) in a projected fiber length (Proj) mode of the above-described device, and is a length-weight average fiber length. Moreover, the fiber length is measured using only the fibrillated heat-resistant fiber. The fiber length of the fibrillated heat-resistant fiber is 0.30 to 0.75 mm and more preferably 0.40 mm to 0.70 mm. When the fiber length is shorter than 0.30 mm, the non-woven fabric is extremely clogged and an impedance increases. When the fiber length is longer than 0.75 mm, thickness non-uniformity is caused due to pilling, which leads to degradation of heat resistance and occurrence of internal short-circuit.

In the present invention, the fiber width of the fibrillated heat-resistant fiber is measured using Kajaani FiberLab V3.5 (manufactured by Metso Automation) as a device. The percentage of a particular fiber width is Population fractions in a Fiber width mode of the above-described device. Moreover, the fiber width is measured using only the fibrillated heat-resistant fiber. The percentage of fibrillated heat-resistant fibers with a fiber width of 12 to 40 µm is equal to or higher than 55% and lower than 75%, more preferably equal to or higher than 60%, and much more preferably equal to or higher than 65%. The fibrillated heat-resistant fiber has such properties that poor dispersibility is exhibited and pilling easily occurs. The percentage of fibrillated heat-resistant fibers with a fiber width of 12 to 40 µm is lower than 55%, problems such as degradation of the heat resistance and occurrence of the internal short-circuit are caused due to the thickness non-uniformity caused by pilling. When the percentage is equal to or higher than 75%, the non-woven fabric is extremely clogged and the impedance increases.

In the present invention, the average curl rate (CURL) of the fibrillated heat-resistant fiber is measured using Kajaani FiberLab V3.5 (manufactured by Metso Automation) as a device. The CURL is Fiber curl in a Fiber curl distribution mode of the above-described device.

According to the manual of the above-described device, a calculation formula for the CURL is as follows:

Average Curl Rate (CURLi) of Fiber

CURL$i$ (%)=[$Lc(n)i/Lp(n)i$−1]×100, where CURL$i$: Fiber Curl,
Lc(n)$i$: Actual Fiber Length (Length along Center line),
Lp(n)$i$: Projected Fiber Length (Linear Measurement), and
$i$: Class ($i$=1 to 152).

Average Curl Rate (CURL, Fiber curl)

CURL (%)=Σ($ni$×CURL$i$)/Σ$ni$, where $ni$=Number of Fibers for Class $i$.

In the present invention, the average curl rate (CURL) only for the fibrillated heat-resistant fiber is measured. The average curl rate (CURL) of the fibrillated heat-resistant fiber is equal to or higher than 5% and equal to or lower than 45%, more preferably equal to or higher than 10% and equal to or lower than 35%, and much more preferably equal to or higher than 15% and equal to or lower than 25%. In a case where the average curl rate (CURL) of the fibrillated heat-resistant fiber is lower than 5%, a strength decreases in some cases due to insufficient fiber entanglement. In a case where the average curl rate (CURL) of the fibrillated heat-resistant fiber exceeds 45%, the fiber dispersibility is extremely low, and in some cases, the internal short-circuit occurs due to formation degradation.

The fibrillated heat-resistant fiber is obtained in such a manner that the heat-resistance fiber is processed using, e.g., a refiner, a beater, a mill, a grinding device, a rotary homogenizer configured to provide shear force by a high-speed rotary blade, a double-cylinder high-speed homogenizer configured to generate shear force between a cylindrical inner blade rotating at high speed and a fixed outer blade, an ultrasonic disintegrator for refinement with ultrasonic impact, or a high-pressure homogenizer configured to provide a pressure difference of at least 20 MPa to a fiber suspension such that the speed of the fiber suspension increases by passage of the fiber suspension through a small-diameter orifice and provide shear force and cutting force to fibers by rapid deceleration of the fiber suspension due to collision.

In the present invention, examples of a synthetic short fiber as an essential component forming the non-woven fabric include a short fiber made of resin such as polyolefin, polyester, polyvinyl acetate, ethylene-vinyl acetate copolymer, polyamide, acrylic, polyvinyl chloride, polyvinylidene chloride, polyvinyl ether, polyvinyl ketone, polyether, polyvinyl alcohol, diene, polyurethane, phenol, melamine, furan, urea, aniline, unsaturated polyester, fluorine, silicone, and derivatives thereof and the above-described heat-resistant fibers. The synthetic short fiber enhances the tensile strength and piercing strength of the non-woven fabric.

The synthetic short fiber is a non-fibrillated fiber, and may be a fiber (a single fiber) made of a single type of resin or a composite fiber made of two or more types of resin. Moreover, a single type of fiber or a combination of two or more types of fibers may be used as the synthetic short fiber contained in the non-woven fabric of the present invention. Examples of the composite fiber include a core sheath type, an eccentric type, a side-by-side type, a sea-island type, an orange type, and a multi-bimetal type.

The fineness of the synthetic short fiber is preferably 0.02 to 2.5 dtex and more preferably 0.1 to 2.0 dtex. In a case where the fineness of the synthetic short fiber exceeds 2.5 dtex, a fiber diameter increases and the number of fibers in a thickness direction decreases, and therefore, it is difficult to make the separator thin. In a case where the fineness of the synthetic short fiber is less than 0.02 dtex, it is difficult to achieve stable fiber manufacturing.

The fiber length of the synthetic short fiber is preferably equal to or longer than 1 mm and equal to or shorter than 10 mm and more preferably equal to or longer than 1 mm and equal to or shorter than 6 mm. In a case where the fiber length exceeds 10 mm, this may lead to poor formation. On the other hand, in a case where the fiber length is shorter than 1 mm, the mechanical strength of the non-woven fabric is weakened in some cases.

In the present invention, the total content of the fibrillated heat-resistant fibers and the synthetic short fibers in the non-woven fabric is preferably 50 to 100% by mass, more preferably 60 to 100% by mass, and much more preferably 80 to 100% by mass. When the total content is lower than 50% by mass, an internal short-circuit defect rate increases in some cases. The mass ratio of the fibrillated heat-resistant fibers to the synthetic short fibers is preferably 7:1 to 1:19, more preferably 5:1 to 3:17, and much more preferably 4:1 to 1:5. In a case where the mass ratio of the fibrillated heat-resistant fibers to the synthetic short fibers is within such a range, heat shrinkage of the separator is small, excellent heat resistance is exhibited, the tensile strength of the non-woven fabric is high, excellent handleability of the non-woven fabric is exhibited, and the non-woven fabric is less likely to be torn upon capacitor production.

In the present invention, the non-woven fabric may contain fibers other than the fibrillated heat-resistant fibers and the synthetic short fibers. Examples of these fibers include a cellulose fiber; pulped and fibrillated objects of a cellulose fiber: a fibrid, a pulped object, and a fibrillated object made of synthetic resin; and an inorganic fiber. Examples of the inorganic fiber include glass, alumina, silica, ceramics, and rock wool. The cellulose fiber may be any of a natural cellulose fiber and a regenerated cellulose fiber.

In the present invention, the grammage of the non-woven fabric is preferably 8 to 25 g/m$^2$, more preferably 9 to 20 g/m$^2$, and much more preferably 10 to 18 g/m$^2$. When the grammage exceeds 25 g/m$^2$, the separator is too thick in some cases. When the grammage is less than 8 g/m$^2$, it is difficult to obtain a sufficient strength in some cases. Note that the grammage is measured based on a method defined in JIS P 8124:2011 (Paper and Board—Determination of Grammage).

In the present invention, the thickness of the non-woven fabric is preferably 8 to 60 μm, more preferably 10 to 55 μm, and much more preferably 12 to 52 μm. When the thickness exceeds 60 μm, the impedance is too high in some cases. When the thickness is less than 8 μm, the strength of a non-woven fabric base material is too weak and there is a probability that the separator is damaged upon separator handling or capacitor production. Note that the thickness means a value measured under a load of 5 N by means of an external micrometer defined in JIS B 7502:2016.

In the present invention, the density of the separator is preferably 0.25 to 0.70 g/cm$^3$ and more preferably 0.40 to 0.60 g/cm$^3$. When the density is less than 0.25 g/cm$^3$, the internal short-circuit easily occurs in some cases. When the density exceeds 0.70 g/cm$^3$, the impedance is too high in some cases. Note that the density is a value (Grammage/Thickness) obtained by division of the grammage by the thickness.

In the present invention, the non-woven fabric is preferably a wet-laid non-woven fabric manufactured by a wet-laid method. In the wet-laid method, fibers are dispersed in water to form a uniform raw material slurry, and after making web by a paper machine from the raw material, the web is dried to produce wet-laid non-woven fabric. Examples of the paper machine include a paper machine using a paper making wire such as a cylindrical wire, a fourdrinier, an inclined wire, or an inclined short wire alone and a combined paper machine including a combination of multiple ones of these paper making wires. At the step of manufacturing the wet-laid non-woven fabric, a hydroentanglement process may be performed as necessary. A process such as a thermal process, a calendering process, or a thermal calendering process may be performed for the non-woven fabric.

EXAMPLES

Hereinafter, the present invention will be described in more detail with reference to examples, but the present invention is not limited to the examples.

[Manufacturing of Separator]

Raw materials were disintegrated in water of a pulper according to parts shown in Table 1, and a uniform raw material slurry (a concentration of 0.5% by mass) i prepared by stirring with an agitator. After wet-laid papermaking from the raw material slurry by means of a cylinder paper machine, a thermal process was performed for the resultant with both surfaces thereof contacting metal rolls heated to 180° C. Further, a calendering process was performed for thickness adjustment. In this manner, a separator including non-woven fabric was manufactured.

Fibers with fiber lengths and fiber widths shown in Table 1 were produced by a fibrillation process with a refiner by means of wholly aromatic polyamide pulps, and were used as fibrillated heat-resistant fibers.

Oriented crystallized polyethylene terephthalate (PET) short fibers and binder PET short fibers were used as synthetic short fibers. As fibrillated natural cellulose fibers, fibrillated natural cellulose fibers which were obtained by fibrillation of natural cellulose by a high-pressure homogenizer and for which the percentage of fibers with a fiber length of equal to or less than 0.20 mm is 75% were used. Note that the parts were by a mass basis.

TABLE 1

| | Fibrillated Heat-Resistant Fiber | | | | | | Synthetic Short Fiber Part | | | | | | |
|---|---|---|---|---|---|---|---|---|---|---|---|---|---|
| | | | | | | | Oriented Crystallized PET Short Fiber | | | Binder PET Short Fiber | | | |
| | Part Fiber Length mm | | | | Percentage % of Fiber Width of | Average Curl Rate Fiber | Fineness Fiber Length | | | | | | Fibrillated Natural Cellulose Fiber |
| | 0.25 | 0.30 | 0.60 | 0.75 | 0.80 | 12 to 14 μm | Curl % | 0.1 dtex 3 mm | 0.3 dtex 3 mm | 0.6 dtex 5 mm | 0.2 dtex 5 mm | 1.1 dtex 5 mm | 1.7 dtex 5 mm | |
| Example 1 | | 50 | | | | 65.7 | 20.5 | 20 | | | | | 20 | 10 |
| Example 2 | | | 50 | | | 66.7 | 20.3 | 20 | | | | | 20 | 10 |
| Example 3 | | | | 50 | | 65.4 | 19.8 | 20 | | | | | 20 | 10 |
| Example 4 | 20 | | | | | 65.0 | 15.5 | | 45 | | | 30 | | 5 |

TABLE 1-continued

| | Fibrillated Heat-Resistant Fiber | | | | | | | Synthetic Short Fiber Part | | | | | | |
|---|---|---|---|---|---|---|---|---|---|---|---|---|---|---|
| | | | | | | | | Oriented Crystallized PET Short Fiber Fineness | | | | Binder PET Short Fiber | | |
| | Part Fiber Length mm | | | | | Percentage % of Fiber Width | Average Curl Rate Fiber | 0.1 dtex | 0.3 dtex | 0.6 dtex | 0.2 dtex | 1.1 dtex | 1.7 dtex | Fibrillated Natural Cellulose Fiber |
| | 0.25 | 0.30 | 0.60 | 0.75 | 0.80 | 12 to 14 μm | Curl % | 3 mm | 3 mm | 5 mm | 5 mm | 5 mm | 5 mm | |
| Example 5 | | | 20 | | | 64.7 | 18.8 | | | 45 | | 30 | | 5 |
| Example 6 | | | | 20 | | 66.6 | 20.7 | | | 45 | | 30 | | 5 |
| Example 7 | | 30 | | | | 62.4 | 24.8 | | | | 50 | 20 | | |
| Example 8 | | | 30 | | | 63.8 | 20.3 | | | | 50 | 20 | | |
| Example 9 | | | | 30 | | 64.0 | 21.0 | | | | 50 | 20 | | |
| Example 10 | | | 50 | | | 65.4 | 4.8 | 20 | | | | | 20 | 10 |
| Example 11 | | | 50 | | | 65.7 | 45.6 | 20 | | | | | 20 | 10 |
| Example 12 | | | 20 | | | 65.4 | 4.5 | | | 45 | | 30 | | 5 |
| Example 13 | | | 20 | | | 63.7 | 47.6 | | | 45 | | 30 | | 5 |
| Comparative Example 1 | 50 | | | | | 78.5 | 20.4 | 20 | | | | | 20 | 10 |
| Comparative Example 2 | | | | | 50 | 54.2 | 22.6 | 20 | | | | | 20 | 10 |
| Comparative Example 3 | 20 | | | | | 81.0 | 21.4 | | | 45 | | 30 | | 5 |
| Comparative Example 4 | | | | | 20 | 51.2 | 18.4 | | | 45 | | 30 | | 5 |
| Comparative Example 5 | 30 | | | | | 78.5 | 17.8 | | | | 50 | 20 | | |
| Comparative Example 6 | | | | | 30 | 51.2 | 23.8 | | | | 50 | 20 | | |

For the separators of the Examples and Comparative Examples, the following measurement and evaluation were performed, and results are shown in Table 2.

[Measurement: Grammage]

A grammage was measured in accordance with JIS P 8124:2011.

[Measurement: Thickness]

Using an external micrometer defined in JIS B 7502:2016, a measurement value under a load of 5 N was taken as a thickness.

[Evaluation: Tensile Strength]

For a sample with 50 mm (CD)×200 mm (MD), a tensile strength was measured in accordance with JIS P 8113:2006.

[Heat Resistance]

The separator was cut into 200 mm (CD)×200 mm (MD), and was left to stand for three hours in a constant-temperature drying machine at 260° C. Shrinkage rates in the MD and the CD were calculated.
Single Circle (Good): the average of the shrinkage rates in the MD and the CD is lower than 0.8%.
Triangle (Average): the average of the shrinkage rates in the MD and the CD is equal to or higher than 0.8% and lower than 1.0%.
Cross Mark (Poor): the average of the shrinkage rates in the MD and the CD is equal to or higher than 1.0%.

[Evaluation: Impedance]

After having been dipped in an electrolytic solution (1M-LiPF$_6$/ethylene carbonate (EC)+diethyl carbonate (DEC)+dimethyl carbonate (DMC) (1:1:1, in terms of a vol ratio)), the produced separator was sandwiched between two substantially-cylindrical copper electrodes. Using an LCR meter (manufactured by Instec Inc., a device name: LCR-821), a resistance component of an alternating-current impedance at 200 kHz was measured.

[Evaluation: Formation]

For the produced separator, sensory evaluation of formation uniformity during passage of light was performed.
Double Circle (Excellent): the formation uniformity is exceedingly good, and no thickness non-uniformity is exhibited.
Single Circle (Good): the formation uniformity is good, and slight thickness non-uniformity is exhibited.
Triangle (Average): the formation uniformity is poor, and the thickness non-uniformity is exhibited. The separator is at a usable level.
Cross Mark (Poor): the formation uniformity is exceedingly poor, and there were concerns about quality. The separator is at an unusable level.

[Evaluation: Internal Short-Circuit Defect Rate]

After the produced separator had been wound with the separator being interposed between electrodes made of aluminum foil to produce an electrode group, the presence or absence of internal short-circuit was checked in such a manner that conduction between the electrodes is checked by a tester without the electrode group being dipped in the electrolytic solution. After checking of 100 electrode groups, an internal short-circuit defect rate was calculated from the number of electrode groups with the internal short-circuit with respect to the total number of electrode groups.

TABLE 2

|  | Grammage g/m² | Thickness μm | Tensile Strength N/m | Heat Resistance | Impedance Ω | Texture | Internal Short-Circuit Defect Rate % |
|---|---|---|---|---|---|---|---|
| Example 1 | 17.5 | 50.0 | 529 | ○ | 0.72 | ○ | 0 |
| Example 2 | 17.4 | 50.5 | 549 | ○ | 0.71 | ◎ | 0 |
| Example 3 | 17.5 | 51.0 | 549 | ○ | 0.72 | ○ | 0 |
| Example 4 | 17.2 | 49.8 | 941 | ○ | 0.65 | ○ | 0 |
| Example 5 | 17.0 | 50.0 | 1019 | ○ | 0.66 | ◎ | 0 |
| Example 6 | 17.1 | 51.1 | 1117 | ○ | 0.64 | ○ | 0 |
| Example 7 | 17.2 | 48.9 | 1470 | ○ | 0.66 | ○ | 0 |
| Example 8 | 17.1 | 49.7 | 1450 | ○ | 0.68 | ◎ | 0 |
| Example 9 | 17.1 | 50.2 | 1470 | ○ | 0.66 | ○ | 0 |
| Example 10 | 17.5 | 50.1 | 353 | ○ | 0.65 | ○ | 0 |
| Example 11 | 17.4 | 50.2 | 568 | ○ | 0.68 | Δ | 0 |
| Example 12 | 17.0 | 49.7 | 686 | ○ | 0.71 | ○ | 0 |
| Example 13 | 17.0 | 49.7 | 1117 | ○ | 0.65 | Δ | 0 |
| Comparative Example 1 | 17.2 | 49.8 | 490 | Δ | 0.90 | X | 0 |
| Comparative Example 2 | 17.5 | 50.9 | 549 | X | 0.72 | X | 5 |
| Comparative Example 3 | 17.0 | 50.1 | 882 | Δ | 0.85 | X | 0 |
| Comparative Example 4 | 16.8 | 51.4 | 921 | X | 0.62 | X | 7 |
| Comparative Example 5 | 17.2 | 50.2 | 1372 | Δ | 0.88 | X | 0 |
| Comparative Example 6 | 16.9 | 51.0 | 1411 | X | 0.65 | X | 6 |

Each of the separators of Examples 1 to 13 includes non-woven fabric containing fibrillated heat-resistant fibers and synthetic short fibers as essential components, and has a fibrillated heat-resistant fiber length of 0.30 to 0.75 mm. The percentage of fibrillated heat-resistant fibers with a fiber width of 12 to 40 μm is equal to or higher than 55% and lower than 75%. Thus, advantageous effects that a high heat resistance is exhibited, an impedance is not too high, and the internal short-circuit is less likely to occur was achieved. Moreover, for the separators of Examples 1 to 9, the average curl rate of the fibrillated heat-resistant fiber is 5 to 45%, and therefore, advantageous effects that uniform formation is exhibited and the thickness non-uniformity is reduced was also achieved.

In comparison among the Examples 2, 10 and 11, the separator of Example 2 for which the average curl rate of the fibrillated heat-resistant fiber is 5 to 45% had a higher strength and exhibited more uniform formation as compared to the separator of Example 10 for which the average curl rate of the fibrillated heat-resistant fiber was lower than 5%. Moreover, the separator of Example 2 exhibited more uniform formation as compared to the separator of Example 11 for which the average curl rate of the fibrillated heat-resistant fiber exceeded 45%.

In comparison among Examples 5, 12 and 13, the separator of Example 5 for which the average curl rate of the fibrillated heat-resistant fiber was 5 to 45% has a higher strength and exhibited more uniform formation as compared to the separator of Example 12 for which the average curl rate of the fibrillated heat-resistant fiber was lower than 5%. Moreover, the separator of Example 5 exhibited more uniform formation as compared to the separator of Example 13 for which the average curl rate of the fibrillated heat-resistant fiber exceeded 45%.

For the separators of Comparative Examples 1, 3 and 5, the fiber length of the fibrillated heat-resistant fiber was shorter than 0.30 mm, and the percentage of fibrillated heat-resistant fibers with a fiber width of 12 to 40 μm was equal to or higher than 75%. Thus, these separators had higher impedances as compared to the separators of Examples 1 to 13.

For the separators of Comparative Examples 2, 4 and 6, the fiber length of the fibrillated heat-resistant fiber was longer than 0.75 mm, and the percentage of fibrillated heat-resistant fibers with a fiber width of 12 to 40 μm was lower than 55%. Thus, as compared to the separators of Examples 1 to 13, the separators of these Comparative Examples exhibited exceedingly poor formation, were at such a level that there are concerns about quality, and exhibited the thickness non-uniformity. As a result, the heat resistance was degraded, and the internal short-circuit defect rate was high.

INDUSTRIAL APPLICABILITY

The present invention can be suitably utilized as a solid electrolytic capacitor separator or a hybrid electrolytic capacitor separator.

The invention claimed is:

1. A solid electrolytic capacitor separator comprising:
   non-woven fabric,
   wherein the non-woven fabric contains a fibrillated heat-resistant fiber and a synthetic short fiber as essential components,
   a fiber length of the fibrillated heat-resistant fiber is 0.30 to 0.75 mm, and
   a percentage of fibrillated heat-resistant fibers with a fiber width of 12 to 40 μm is equal to or higher than 55% and lower than 75%.

2. The solid electrolytic capacitor separator according to claim 1, wherein
   an average curl rate (CURL) of the fibrillated heat-resistant fiber is 5 to 45%.

* * * * *